United States Patent [19]

Baumgartner et al.

[11] Patent Number: 5,439,078
[45] Date of Patent: Aug. 8, 1995

[54] PNEUMATICALLY OPERATED SLIDING-CALIPER DISK BRAKE FOR COMMERCIAL VEHICLES

[75] Inventors: Hans Baumgartner, Moosburg; Dieter Bieker, Munich, both of Germany

[73] Assignee: Knorr-Bremse AG, Munich, Germany

[21] Appl. No.: 235,883

[22] Filed: May 2, 1994

[30] Foreign Application Priority Data

May 4, 1993 [DE] Germany ............... 43 14 719.4

[51] Int. Cl.⁶ ............................................. F16D 65/14
[52] U.S. Cl. ................................................ 188/73.45
[58] Field of Search ............. 188/73.43, 73.44, 73.45, 188/71.1, 73.39, 73.42

[56] References Cited

U.S. PATENT DOCUMENTS

| 4,022,303 | 5/1977 | Kondo et al. | 188/73.45 |
| 4,331,221 | 5/1982 | Evans et al. | 188/73.44 |
| 4,557,354 | 12/1985 | Sakakibara | 188/73.45 |

FOREIGN PATENT DOCUMENTS

| 3643922 | 6/1988 | Germany | 188/73.45 |
| 3716202 | 11/1988 | Germany. | |
| 4032885 | 4/1992 | Germany. | |
| 4212384 | 10/1993 | Germany. | |
| 2174157 | 10/1986 | United Kingdom | 188/73.45 |
| 2184501 | 6/1987 | United Kingdom | 188/73.45 |

*Primary Examiner*—Robert J. Oberleittner
*Assistant Examiner*—Lee W. Young
*Attorney, Agent, or Firm*—Barnes & Thornburg

[57] ABSTRACT

A pneumatically operated sliding-caliper disk brake wherein the sliding-caliper is mounted to two fixed guide members by two guide bearings having elastomer bearing bushings of different length bearing surfaces for displacement in the axial direction of the brake disk. The longer elastomer bearing bushing is dimensioned such that a transition fit exists to the its guide member, while the shorter elastomer guide bushing is dimensioned to have a defined play to its guide member.

16 Claims, 2 Drawing Sheets

PNEUMATICALLY OPERATED SLIDING-CALIPER DISK BRAKE FOR COMMERCIAL VEHICLES

BACKGROUND AND SUMMARY OF THE INVENTION

The present invention relates to a pneumatically operated sliding-caliper disk brake for commercial vehicles and particularly for commercial road vehicles.

Pneumatically operated or pneumatic disk brakes of the above-mentioned type are known, for example, from German Patent Document DE-OS 37 16 202, German Patent Document DE-OS 40 32 885 as well as German Patent Document DE-OS 42 12 384 which is no prior publication. In the case of these known disk brakes, a caliper, which can be displaced in the axial direction to the brake disk, reaches around a brake disk and, because of this bearing, is also called a "sliding caliper". On one side of the sliding caliper, a pneumatically operated application device is arranged. When this application device is operated, a brake shoe, which is situated on this side of the brake disk, is pressed against the respective friction surface of the brake disk. The sliding caliper is displaced in the opposite direction because of the reaction forces and, presses a brake shoe, which is situated on the opposite side also against the brake disk. Thus, a corresponding braking effect is achieved by the friction of the two brake shoes on the brake disk.

In the case of these known disk brakes, the sliding caliper is mounted, by two guide bearings, on corresponding guide members or bearing rods of a brake anchor plate which is mounted to be fixed to the vehicle. One of the two guide bearings has a brass guide bushing as the bearing element, while the other guide bearing has an elastomer guide bushing as the bearing element. However, the brass guide bushing of the known disk brakes has considerable disadvantages. The costs of such a bushing are significantly higher than those of an elastomer guide bushing. A considerably higher degree of hardness and a higher precision during the grinding of the guide member are required so that correspondingly its manufacturing costs are also increased.

Furthermore, it is a disadvantage that, in the case of a brass guide bushing, a two-sided sealing is required, for example, in the form of bellows, in order to reliably prevent moisture from reaching the interior of the application device and impairs its operatability by the action of rust. Also, such a bearing has a poor damping behavior in the case of shaking movements of the commercial vehicle. Finally, there is also the danger that as a result of an abrasion of the brass guide bushing or of its guide member because of shaking movements or as a result of a long-time wear, a sluggishness of the sliding caliper may occur which may result in a correspondingly reduced braking performance.

Because of the described disadvantages of such brass guide bushings, efforts have been made to use alternative bearings in which these disadvantages can at least partially be avoided. In this connection, it has also been attempted to equip both bearings of the sliding caliper with elastomer guide bushings, as, for example, in the case of the sliding-caliper bearings of passenger cars. However, in the case of the disk brakes of the above mentioned type provided for commercial vehicles, these attempts have so far failed because in the case of a two-sided elastomer bearing, no sufficient guiding stability of the sliding caliper could be achieved. However, since this type of guiding stability does not ensure sufficient functional reliability, such a two-sided elastomer bearings have been rejected as an unusable solution.

It is an object of the invention to further develop a pneumatically operated sliding-caliper disk brake in such a manner that the bearing of the sliding caliper is low in cost but nevertheless has good guiding characteristics.

According to the invention, it is therefore suggested to provide an elastomer guide bushing in one of the two guide bearings which elastomer bushing has a relatively long bearing surface and is dimensioned such that a transition fit exists with respect to the assigned guide member while an elastomer guide bushing is provided in the other guide bearing which has a relatively short bearing surface and is dimensioned such that the assigned guide member slides with a defined play. That is, according to the invention, two elastomer guide bushings of different lengths are used which have different inside diameters dimensioned according to the above teaching. Detailed tests have demonstrated that the selection of the elastomer guide bushings according to the invention results in a guiding stability of the sliding caliper which is sufficient in every case. The invention therefore provides a sliding-caliper bearing which, despite the two-sided use of elastomer bearings, has a good guide guiding stability of the sliding caliper and therefore always ensures sufficient operating precision of the disk brake.

With the sliding-caliper bearing according to the invention, the use of brass guide bushings is not necessary and instead low-price elastomer guide bushings can be used. Thus, the manufacturing costs are reduced correspondingly. A further reduction of the manufacturing costs is obtained because no hardened and extremely precisely ground guide members are required on the brake anchor plate.

In order to avoid stockkeeping of spare parts unnecessarily difficult by using elastomer guide bushings of different lengths suggested by the invention, it is recommended to use several individual elastomer guide bushings for the guide bearing having the longer bearing surface. In this connection, it was found to be particularly advantageous to provide in the above-mentioned guide bearing two elastomer guide bushings which are preferably situated in its end area. In which case, a single elastomer guide bushing with the same dimensions should be used for the other guide bearing so that the bearing according to the invention requires only one type of elastomer guide bushings. Accordingly, this preferred embodiment of the invention has the advantage that the stockkeeping of suitable spare parts is as simple as possible.

Tests have also shown that excellent guiding characteristics of the sliding caliper can also be achieved particularly when the above-mentioned defined play of the second guide member is between 0.2 and 0.5 mm. In contrast, the above-mentioned transition fit of the first guide member should be adjusted such that a relatively narrow play or possibly even a slight pressing exists with respect to the concerned elastomer guide bushing.

In order to achieve a bearing of the sliding caliper which is as mobile as possible, it is recommended to provide the elastomer guide bushings with a friction-reducing material on their bearing surfaces which may, for example, a dry lubricant. It is also possible to use a friction-reducing plastic material for this purpose which is applied to the bearing surface in the form of a layer, is embedded as a foil or molded on or, as an alternative, is present as an embedded or molded-on fabric strip. A plastic material which is particularly suitable for this purpose is teflon.

A particularly simple mounting and a similarly simple exchange of the elastomer guide bushings according to the invention may be achieved if a surrounding bead is formed on the outer circumference of the elastomer guide bushings which can be introduced into a correspondingly shaped recess or a groove of the corresponding guide bearing. In this case, it is possible to slide the corresponding elastomer guide bushing into a guide bearing until the surrounding bead engages in the groove. After the guide member is introduced into the guide bearing, the elastomer guide bushing will then be secured so that it cannot be lost.

In order to avoid water penetrating into the gap between an elastomer guide bushing and the guide bearing and causing corrosion which reduces the installing diameter of the elastomer guide bushing and therefore disadvantageously changes the respective given guiding characteristics of the bearings according to the invention, it is provided according to the further development of the invention to construct a surrounding sealing profile at least on one of the two ends of the outer circumferential surface of each elastomer guide bushing. Similarly, on at least one of the two ends of the bearing surface of each elastomer guide bushing, an annular sealing lip is developed which reliably prevents dirt of any kind from penetrating into the guide area of the bearing.

By using the sealing lip according to the invention as well as the surrounding sealing profile, it is also achieved that the bellows for the sealing-off of the bearing required in the state of the art will not be necessary. Thus, snug fits required for the fastening of such bellows will also not be required. This achieves not only a corresponding saving of costs but also the additional advantage that the space required for the bellows can be used for a corresponding lengthening of the guide zone of the bearing without the requirement of having to increase the outer dimensions of the sliding caliper. In this manner, a still better guiding stability can be achieved.

Although the two-sided elastomer bearing according to the invention ensures excellent damping characteristics of the sliding caliper and, in addition, largely prevents the danger of a jamming of the sliding caliper, these positive characteristics may possibly still be improved. Several surrounding recesses are constructed in the bearing surface of each elastomer guide bushing. Depending on the dimensioning, recesses of this type improve the damping characteristics of the bearing.

A particularly suitable material for the elastomer guide bushings is, for example, a rubber material.

Other objects, advantages and novel features of the present invention will become apparent from the following detailed description of the invention when considered in conjunction with the accompanying drawings.

DESCRIPTION OF THE PREFERRED EMBODIMENTS

Figure 1:
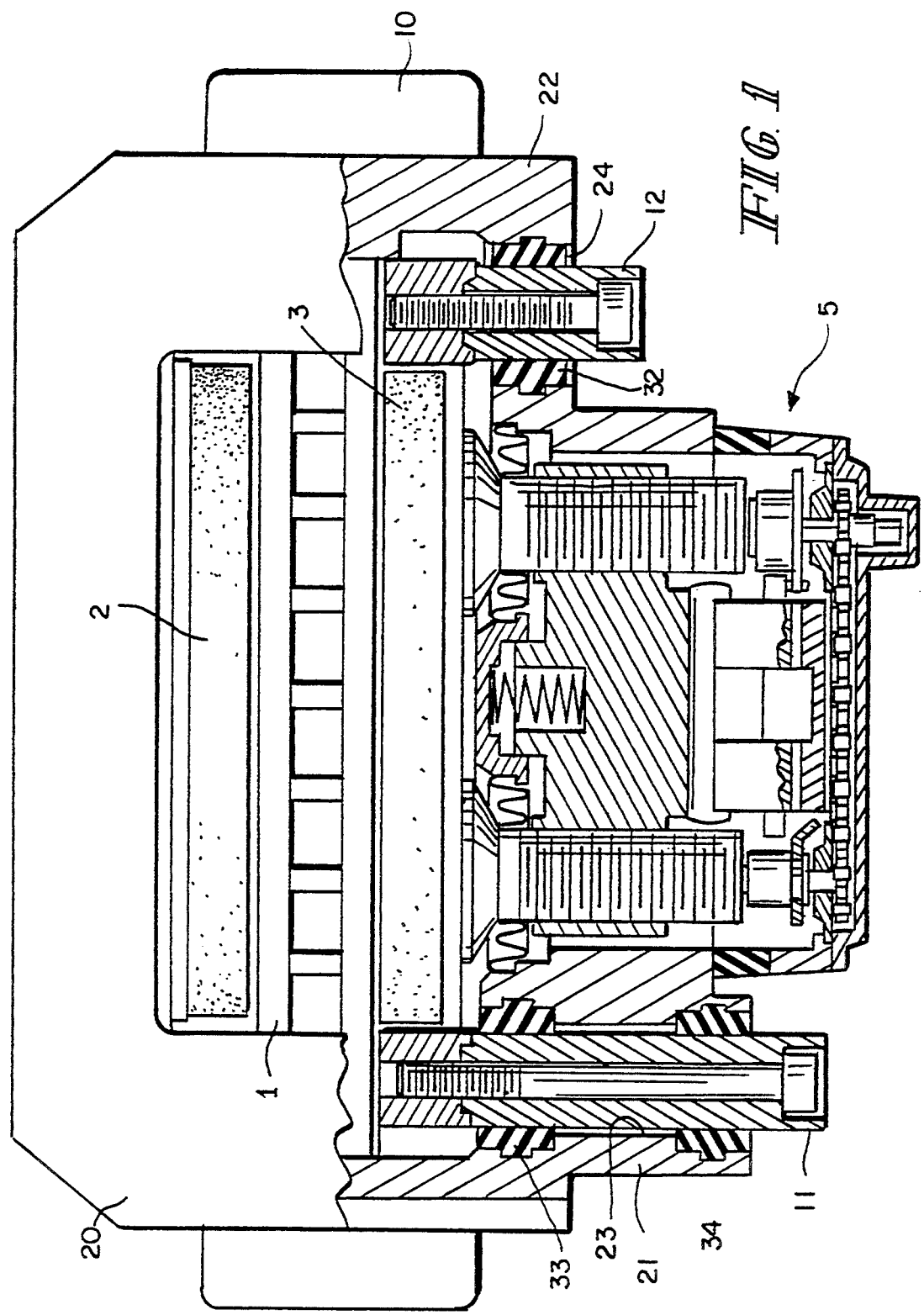
FIG. 1 is a schematic, partial cutaway top view of the basic construction of the sliding-caliper disk brake according to the invention.

According to FIG. 1, a brake anchor plate 10 is fastened to the frame or the like of a commercial vehicle which is not shown. On this brake anchor plate 10, two guide members 11 and 12 are fastened in the radial direction to a brake disk 1 in a parallel arrangement. According to the invention, guide member 11 is longer than guide member 12.

Two bores 23 and 24 are in a sliding-caliper 20, each form a respective guide bearing 21 and 22 for the slidable bearing of the sliding caliper on the guide members 11 and 12 of the brake anchor plate 10. After the mounting of the caliper 20 on the guide members 11 and 12 of the brake anchor plate 10, the sliding-caliper 20 will reach around the brake disk 1 so that brake shoes 2, 3 on both sides, in the inoperative condition of the brake, have a given distance (the so-called "ventilating play") from the respective friction surface of the brake disk 1.

When a brake cylinder, which is not shown, is acted upon by compressed air, an application device 5, which is shown only schematically, presses the brake shoe 3 situated on its side against the brake disk 1. The sliding caliper 20, in the case of a further rise in pressure, is displaced in the opposite direction until the opposite brake shoe 2 also rests against the brake disk 1. In this "applied" condition, the brake disk 1, as a function of the respective brake pressure, is braked by the friction of its friction surfaces on the brake shoes 2, 3.

According to the invention, the sliding caliper is positioned in both guide bearings 21 and 22 on elastomer guide bushings. In the longer guide bearing 21, one elastomer guide bushing 33 and 34 respectively is provided on the respective end area, whereas only one elastomer bushing 32 is disposed in the opposite shorter guide bearing 22. Furthermore, the guiding characteristics of the two bearings are each adjusted differently as a result of a corresponding dimensioning. In the longer bearing 21, the inside diameters of the elastomer guide bushings 33 and 34 are selected such that their bearing surfaces have a transition fit to the outer surface of the guide member 11. In this case, the term transition fit is to signify a relatively narrow play or possibly a slight pressing between these two parts. In contrast, the inside diameter of the elastomer guide bushing 32 is selected such that the second guide member 12 slides with a defined play. Detailed tests have shown that the combination according to the invention of the different length of the guide bearings and the different fit of the respective elastomer guide bushings ensures an excellent guiding stability.

The distance of the bearing surface of the elastomer guide bushings from the outer surface of the corresponding guide member required for achieving the mentioned press fit or the defined play may naturally also be adjusted by a corresponding change of the inside diameter of the respective guide bearing 21 and 22. It is also possible to correspondingly adapt the outside diameter of the guide member 11 and 12. In contrast to a corresponding dimensioning of the elastomer guide bushings, the two latter possibilities have the advantage that a single type of elastomer guide bushing can be used which, on the one hand, simplifies stockkeeping and, on the other hand, excludes the possibility of an incorrect mounting.

Although in the shown embodiment, two elastomer guide bushings are provided in the guide bearing 21, it is also possible to use a still larger number of guide bushings if this is useful. Likewise, it is possible to use a single elastomer guide bushing whose length corresponds for example to that of the guide bearing 21. It is only important that the overall guide length of the elastomer guide bushing(s) of the guide bearing 21 corresponding to the teaching of the invention is longer than that of the guide bearing 12. However, the shown embodiment is advantageous in that it offers the possibility of having to provide only one type of elastomer guide bushing for both sides of the bearings.

Figure 2:
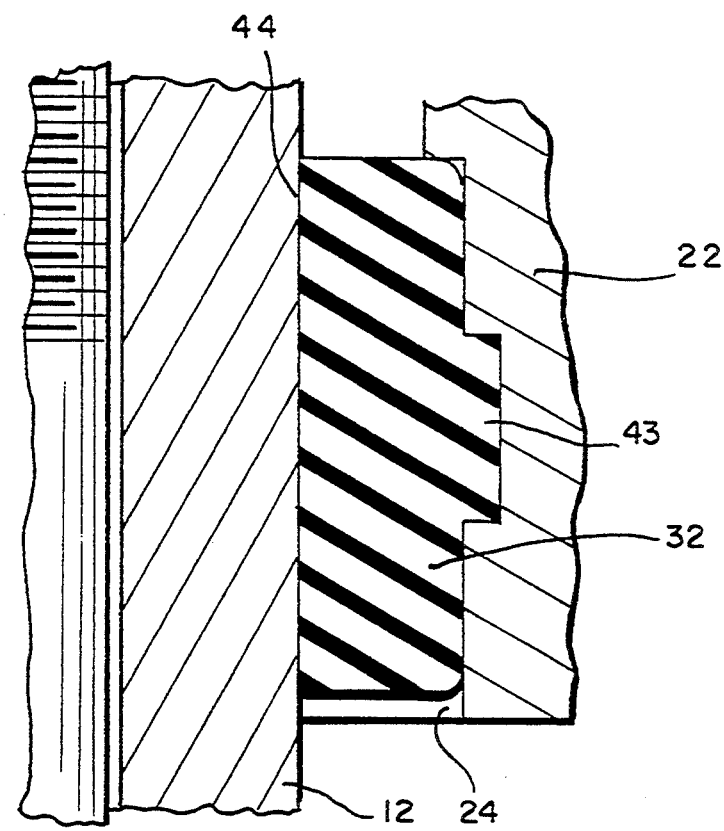
FIG. 2 is a detailed view of one of the two slide bearings.
Figure 3:
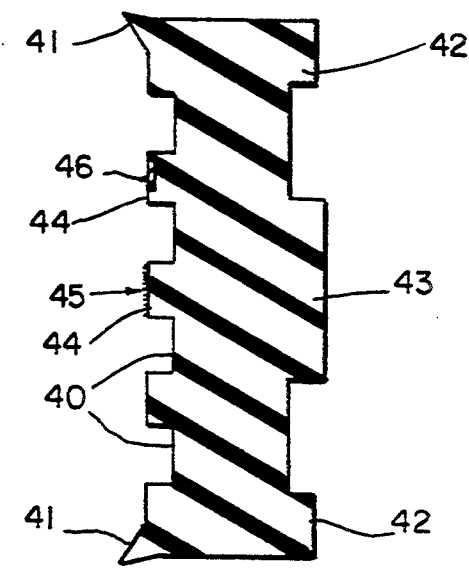
FIG. 3 is view of the detailed construction of a preferred embodiment of an elastomer guide bearing according to the invention.

FIGS. 2 and 3 show detailed preferred embodiments of the elastomer guide bushings according to the invention. FIG. 2 is an enlarged detailed view of the shorter guide bearing 22. Both figures indicate that a surrounding bead 43 is formed on the outer circumference approximately in the center of the elastomer guide bushing. The bead 43 is dimensioned such that it can be introduced into a correspondingly shaped recess or a groove of the guide bearing. Despite the simple mounting and demounting, the elastomer guide bushing is securely held in the guide bearing.

On both ends of the bearing surface 44 as shown in FIG. 3, one annular sealing lip 41 respectively is developed which prevents water or dirt from penetrating into the interior of the application device. The penetrating of water through the gap between the outer surface of the elastomer guide bushing and the guide bearing is prevented by two surrounding sealing profiles 42 which are also constructed on the outer ends of the elastomer guide bushing. It may possibly be sufficient to provide only one sealing lip 41 and only one sealing profile 42. As a result of the sealing lip and because of the surrounding sealing profile, the bellows required in the case of conventional bearings for the purpose of sealing will not be necessary. The snug fits, which are required for the fastening of such bellows, are therefore also not required. As a result, not only a corresponding saving of costs is achieved but also the additional advantage that the space required for the bellows can be used for a corresponding lengthening of the guide zone of the bearing without increasing the outer dimensions of the sliding caliper. In this manner, a still better sliding stability can be achieved.

FIG. 3 also shows several surrounding recesses in the bearing surface 44 of the elastomer guide bushing. Using a suitable dimensioning of the depth and the width of these recesses, it is possible to change the damping characteristics of the elastomer guide bushing as required.

On its bearing surface 44, the elastomer guide bushing of FIG. 3 is provided with a friction-reducing material 45. For this purpose, a dry lubricant may, for example, be used. It is also possible to apply a teflon layer to the bearing surface 44. As an alternative, a teflon foil or a teflon fabric strip may also be embedded in the bearing surface 44 or molded on, as illustrated at 46. Other plastic material may also be used, if required. Rubber is preferably used as the material for the elastomer guide bushing.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A pneumatically operated sliding-caliper disk brake for commercial road vehicles, including a sliding-caliper, which reaches around a brake disk, and first and second guide bearings slidably mounting said sliding-caliper on a correspondingly first and second guide members of a vehicle-fixed brake anchor plate to move said sliding-caliper in the axial direction of the brake disk, and further comprising;
    a first elastomer guide bushing in said first guide bearing and having a bearing surface of a first length and an interior bore having a transition fit to the first guide member; and
    a second elastomer guide bushing in the second guide bearing and having a bearing surface of a second length substantially shorter that said first length and an interior bore having a defined play with the second guide member compared to said transition fit.

2. A disk brake according to claim 1, wherein the first elastomer guide bushing of the first guide bearing is several elastomer guide bushings.

3. A disk brake according to claim 1, wherein the first guide bushing is two elastomer guide bushings;
    the second guide bearing is a single elastomer guide bushing; and
    these three elastomer guide bushings have the same length bearing surface.

4. A disk brake according to claim 1, wherein the defined play between the second guide member and the second guide bearing is between 0.2 and 0.5 mm.

5. A disk brake according to claims 1, wherein the elastomer guide bushings include a friction-reducing material on their bearing surfaces.

6. A disk brake according to claim 5, wherein said friction-reducing material is a dry lubricant.

7. A disk brake according to claim 5 wherein said friction-reducing material is a layer of a friction-reducing plastic material applied-to, embedded-in or molded-on the bearing surface.

8. A disk brake according to claim 5, wherein the friction-reducing material is teflon.

9. A disk brake according to claim 1, wherein the elastomer guide bushings include a surrounding bead on their outer circumference and received in a correspondingly shaped recess of a respective guide bearing.

10. A disk brake according to claim 1, wherein the elastomer guide bushings includes an annular sealing lip on at least one of the two ends of their bearing surface.

11. A disk brake according to claim 10, wherein the elastomer guide bushings each include a surrounding sealing profile on at least one of the two ends of their outer circumferential surface.

12. A disk brake according to claim 1, wherein the elastomer guide bushings each include a surrounding sealing profile on at least one of the two ends of their outer circumferential surface.

13. A disk brake according to claim 10, wherein the elastomer guide bushings each include several recesses in the bearing surface of the elastomer guide bushings.

14. A disk brake according to claim 1, wherein the elastomer guide bushings each include several recesses in the bearing surface of the elastomer guide bushings.

15. A disk brake according to claim 1, wherein the elastomer guide bushings are made of a rubber material.

16. A disk brake according to claim 1, wherein the first guide bearing is substantially longer than said second guide bearing.

* * * * *